US011052405B2

(12) United States Patent
Pine

(10) Patent No.: US 11,052,405 B2
(45) Date of Patent: *Jul. 6, 2021

(54) METHOD AND SYSTEM FOR CLEANING SAND

(71) Applicant: KB Foundry Services, LLC, Burbank, OH (US)

(72) Inventor: Mark Pine, Burbank, OH (US)

(73) Assignee: KB Foundry Services, LLC, Burbank, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,039

(22) Filed: Oct. 29, 2019

(65) Prior Publication Data
US 2020/0061634 A1 Feb. 27, 2020

Related U.S. Application Data

(63) Continuation of application No. 15/905,222, filed on Feb. 26, 2018, now Pat. No. 10,493,466.
(Continued)

(51) Int. Cl.
*B03B 9/04* (2006.01)
*B22C 1/00* (2006.01)
(Continued)

(52) U.S. Cl.
CPC ............ *B03B 9/04* (2013.01); *B03B 5/34* (2013.01); *B08B 3/14* (2013.01); *B22C 1/00* (2013.01);
(Continued)

(58) Field of Classification Search
CPC .... B03B 9/04; B03B 5/34; B03B 3/14; B22C 1/00; B22C 5/185; B22C 9/02; B04C 9/00; B01D 21/26; B01D 21/267
See application file for complete search history.

(56) References Cited

U.S. PATENT DOCUMENTS

| 2,480,748 | A |   | 8/1949 | Luce et al. |
| 2,783,511 | A | * | 3/1957 | Will ........................ B22C 5/185 |
|           |   |   |        | 209/173 |

(Continued)

FOREIGN PATENT DOCUMENTS

| EP | 08766866 A1 | 11/1998 |
| EP | 1387729 A2 | 2/2004 |

(Continued)

OTHER PUBLICATIONS

International Search Report and Written Opinion from corresponding International Patent Application No. PCT/US2018/019723, dated May 7, 2019, 16 pages.
(Continued)

*Primary Examiner* — Sharidan Carrillo
(74) *Attorney, Agent, or Firm* — Tucker Ellis LLP; Heather M. Barnes

(57) ABSTRACT

One or more techniques and/or systems are disclosed for producing beneficial re-use sand from foundry sand. Foundry sand can be collected from a mold making operation, and/or from the casting removal and cleaning process. The collected sand product can be cleaned and separated into a clay and carbon mixture, and a beneficial re-use sand. The collected sand product can be cleaned by mixing with water, and subjecting the resulting mix to a hydrocyclone at appropriate flow rates. The hydrocyclone can separate the mix into a carbon, clay and water mix for re-use, and a wet sand mix. Water can be separated from the wet sand and reused, and the resulting sand can be used as beneficial re-use sand.

13 Claims, 1 Drawing Sheet

Related U.S. Application Data

(60) Provisional application No. 62/463,235, filed on Feb. 24, 2017.

(51) Int. Cl.

| | | |
|---|---|---|
| *B03B 5/34* | (2006.01) | |
| *B08B 3/14* | (2006.01) | |
| *B22C 5/18* | (2006.01) | |
| *B22C 9/02* | (2006.01) | |
| *B01D 21/26* | (2006.01) | |
| *B04C 9/00* | (2006.01) | |

(52) U.S. Cl.
CPC .............. *B22C 5/185* (2013.01); *B01D 21/26* (2013.01); *B01D 21/267* (2013.01); *B04C 9/00* (2013.01); *B22C 9/02* (2013.01)

(56) References Cited

U.S. PATENT DOCUMENTS

| | | | |
|---|---|---|---|
| 2,941,942 A | 6/1960 | Dahlstrom et al. | |
| 5,045,090 A * | 9/1991 | Pohl | B22C 5/044 |
| | | | 512/6 |
| 5,163,562 A | 11/1992 | Wilhelm et al. | |
| 5,289,920 A | 3/1994 | Godderidge et al. | |
| 6,554,049 B2 | 4/2003 | Steele et al. | |
| 6,715,705 B2 | 4/2004 | Rowley, Jr. | |
| 6,834,706 B2 | 12/2004 | Steele et al. | |
| 9,138,803 B2 | 9/2015 | LaFay et al. | |
| 10,493,466 B2 * | 12/2019 | Pine | B22C 5/185 |
| 2003/0029592 A1 * | 2/2003 | Steele | B22C 5/185 |
| | | | 164/5 |
| 2008/0202986 A1 * | 8/2008 | Fontaine | B22C 5/185 |
| | | | 209/17 |
| 2012/0325113 A1 | 12/2012 | Lafay | |
| 2015/0114259 A1 | 4/2015 | Ogura et al. | |
| 2018/0243755 A1 | 8/2018 | Pine | |
| 2019/0193142 A1 * | 6/2019 | Darlington, Jr. | B03B 9/04 |
| 2020/0061634 A1 * | 2/2020 | Pine | B03B 5/34 |

FOREIGN PATENT DOCUMENTS

| | | |
|---|---|---|
| EP | 2191909 B1 | 6/2010 |
| GB | 2238740 A | 6/1991 |
| WO | 2001085336 A1 | 11/2001 |
| WO | 2011082464 A1 | 7/2011 |

OTHER PUBLICATIONS

S. Fiore & M.C. Zanetti (2008) Industrial Treatment Processes for Recycling of Green Foundry Sands, International Journal of Cast Metals Research, 21:6, 435-438.

* cited by examiner

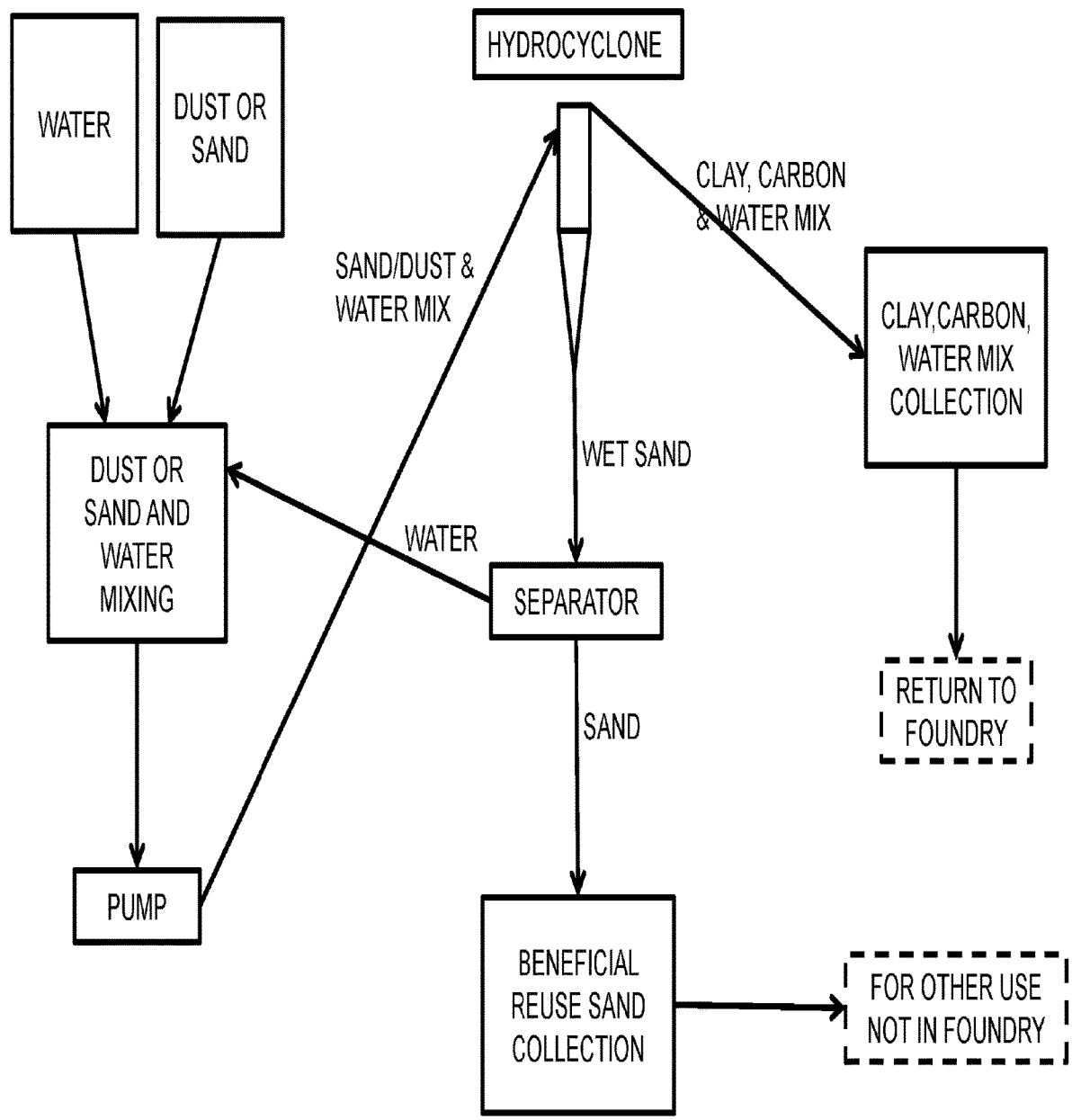

METHOD AND SYSTEM FOR CLEANING SAND

This continuation application claims priority to nonprovisional application Ser. No. 15/905,222, now U.S. Pat. No. 10,493,466, entitled Method and System for Cleaning Sand filed on Feb. 26, 2018, which claims priority to provisional application having application No. 62/463,235, entitled Method and System for Cleaning Sand, filed Feb. 24, 2017, which is incorporated herein by reference.

BACKGROUND

Foundry operations utilize green sand to create molds for casting metal products. The green sand typically comprises a mixture of sand, a binder material (e.g., clay and carbon mix), and water. The molds are formed, the casting is made, and the used sand is removed from the casting. The resulting used sand can be disposed of, or portions may be re-used after being subjected to specialized treatment. Re-using sand products from a foundry can potentially save resources for a foundry. However, the effective collection and treatment of high-quality re-use sand often utilizes specialized processes and systems.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more methods and systems for cleaning a sand product from a foundry sand handling operation is provided. Foundry sand can be collected from a variety of places in a foundry, including a mold making operation, and/or a casting removal and cleaning process. The collected sand product can be cleaned and separated into a clay and carbon mixture, and a beneficial re-use sand. The clay and carbon mixture may be re-used in the foundry, and the beneficial re-use sand can be used offsite.

In one implementation, a method for producing beneficial re-use sand from foundry sand can comprise mixing water with a sand product at an approximate ratio of two-parts water to one part sand product, resulting in a sand product/water mix. The sand product can be received from a foundry bag-house collector or from spent foundry sand. Further, a clay-carbon and water mix can be extracted from the sand product/water mix, where the clay-carbon and water mix re-used in a foundry. Additionally, wet sand can be extracted from the sand product/water mix. The wet sand can be separated into a water stream and a sand stream. In this implementation, the water stream can be used as at least a portion of the water in the water and sand product mixing. The sand stream from the separation can comprise the resulting beneficial re-use sand.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 1 is a schematic diagram illustrating an implementation of an exemplary system for producing beneficial re-use sand.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

Beneficial re-use foundry sand has found use in a variety of applications and industries. Further, beneficial re-use foundry sand can be a commodity instead of a waste product, potentially saving resources for a foundry. Beneficial re-use foundry sand comprises sand that has been used by the foundry and typically may not be appropriate for re-use by the foundry. Effective collection of high-quality re-use sand may utilize specialized processes and systems.

A system can be devised that can produce high quality beneficial re-use sand, from a foundry. In one example implementation, as illustrated in FIG. 1, a system for producing beneficial re-use sand can comprise a mixer. The mixer can be configured to mix water and a sand product, resulting in a sand product/water mix. As an example, the mixer may be configured to continually (e.g., as a continual or intermittent steam, at least while in operation) receive a supply of water and a supply sand product, and continually mix these ingredients to produce a continual flow (e.g., as a continual or intermittent steam) of the sand product/water mix. In one example, the water and sand product may be received at a top area of the mixer, and the sand product/water mix may be discharged from a bottom portion of the mixer.

In one implementation, the water and sand product may be introduced to the mixer at an approximate ratio of about three-parts water to one part sand product or less. The ratio may be about two-parts water to one part sand product. As an example, for respective batches of the sand product/water mix, approximately sixty pounds of the sand product may be introduced to the mixer, along with approximately one-hundred eighty pounds of water. As another example, for respective batches of the sand product/water mix, approximately sixty pounds of the sand product may be introduced to the mixer, along with approximately one-hundred twenty pounds of water. As another example, the specific ratio of water to sand product may be altered to provide a desired sand product/water mix, depending on the type of sand product that is used for the mix, and the type and specifications of the mixer used, along with the specifications for the other parts of the system.

In one implementation, the sand product may comprise a material that is collected from a foundry bag-house collection system. That is, for example, during foundry sand handling procedures, such as separation of the castings from the molds, handling and reconditioning of the used sand during shake-out or knock-out, mechanical and pneumatic conveying, bucket elevators, mixers and sand coolers, as well as cast cleaning, foundries often employ dust collection equipment to collect the airborne particulate released during these procedures. In this implementation, the collected sand product (e.g., dust and other collected material) can be used as the sand product in the example methods and systems described herein. As one example, the sand product collected from the dust collection systems may comprise approximately fifty percent (50%) sand and approximately fifty percent (50%) clay and carbon mixture. In one non-limiting example, the clay may be a bentonite clay.

In another implementation, the sand product may comprise used sand that is collected from spent foundry sand. As an example, green sand is used for to create the molds for cast products, and after the casting is created, the mold sand can be collected as used or spent foundry sand. Further, during the mold creation process, excess sand may be generated during the mold creation process, which can also be collected. In this example, these types of used foundry sand can comprise the sand product in the example methods and systems described herein. As one example, the sand product collected from the used or spent foundry sand may comprise approximately the same constituent make-up as green sand used to make the molds.

As illustrated in FIG. 1, the water and dust or sand can be mixed in a mixing vessel, such as by using a mixing blade, vessel agitation, and/or vessel rotation, but not limited thereto. Further, in one implementation, the mixing may occur as a batch process, where the ingredients are added and mixed appropriately, resulting in a batch of the water and sand product mix. In another implementation, the mixing may occur as a continuous process. In this implementation, the ingredients can be continuously (e.g., intermittently or in a continuous flow) added to the mixing vessel in the desired proportions (e.g., about 3:1 or less of water to sand product), for example, at a top area of the vessel. Additionally, in this implementation, a resulting desired mixture of the water and sand product may be continuously (e.g., intermittently or in a continuous flow) drawn from the vessel, for example, at a bottom area of the vessel.

As illustrated in FIG. 1, the resulting sand/water mix can be introduced to a hydrocyclone system. For example, a hydrocyclone can be used to separate or sort particles in a liquid based on their fluid resistance. In this example, denser or courser particles (e.g., sand) typically have a higher fluid resistance to a generated centripetal force than the less dense or finer particles (e.g., clay, carbon), as well as water. That is, for example, the sand or dust and water mix can be pumped into the hydrocyclone at a desired pressure (e.g., thirty pounds of pressure per square inch (PSI) or more) to generate a desired centripetal force inside the hydrocyclone. In this example, because the sand is courser and denser than the clay and or carbon found in recovered sand product, wet sand can be separated from a clay, carbon and water mix. Typically, the denser and/or courser material is retrieved from a bottom of the hydrocyclone, and the lighter and/or finer material can be drawn from a top portion of the hydrocyclone.

As an illustrative example, when a desired sand product and water mixture is introduced to the hydrocyclone at a desired flow rate, a resulting separation of the sand from the clay and carbon mix produces a desirable product. For example, the mixing of the water to sand product at a ratio of approximately two parts water to one part sand product produces a desirable product when introduced to the hydrocyclone at a pressure of thirty PSI or more (e.g., up to fifty-five PSI). In this example, the wet sand product and the clay, carbon and water mix product recovered from the hydrocyclone comprises desirable properties for further use (e.g., beneficial re-use sand, and clay, carbon, water mix for foundry use). That is, in one implementation, the mixing of the sand product and water at the desired amount and rate, as described herein, in combination with introduction of the sand product and water mixture into the hydrocyclone at the desired pressure, as described herein, may allow passing the mixture through the hydrocyclone separation process merely the one time, for example, instead of multiple passes through a hydro separation process to obtain the desired separate products.

In one implementation, the clay, carbon and water mix that is collected from the hydrocyclone contains approximately ten to eighteen percent (10-18%) solids, with the remaining portion comprising water. Further, in one implementation, typical makeup of the collected solids can comprise approximately seventy percent (70%) clay and thirty percent (30%) carbon; however, this makeup will be dependent upon the dust or sand input to the mixing portion of the example method or system, along with the setup of the hydrocyclone.

In one implementation, the clay, carbon and water mix can be drawn from the hydrocyclone, and collected, such as in a collection vessel or storage area. In one implementation, the collected clay, carbon and water mix may be returned to the foundry, and reused in the green sand molding process. For example, foundry sand reclamation systems often utilize a sand cooler, which is used to cool the reclaimed sand for re-use (e.g., in a mulling portion). In this example, sand coolers typically introduce water to help cool and temper the sand, and even out temperature spots in the sand. As one example, the water may be, at least partially, substituted with the clay, carbon and water mix collected from the hydrocyclone, and mixed with the reclaimed sand in the cooler.

As another example, foundry sand reclamation systems utilize a muller, which may be used to appropriately mix sand with the clay, carbon and water products, resulting in a green sand product with desirable molding properties. In one implementation, the collected clay, carbon and water mix can be introduced to the green sand production process at the mulling step. That is, for example, water typically used in the muller may be, at least partially, substituted with the clay, carbon and water mix collected from the hydrocyclone, and mixed with the sand in the muller. Mulling can be performed in batches or as a continuous process. It should be understood that in other implementations, the clay and carbon mix may be introduced at any appropriate point in the method of system, including without limitation, a cooler, or the return sand system.

In one example, approximately ten gallons of the clay, carbon and water mix collected from the hydrocyclone can be added to a batch of green sand in the muller, or prior to the molding process without additional mulling. As an example, because the clay, carbon and water mix collected from the hydrocyclone already comprises the products needed to make green sand (e.g., other than sand), the mix may be added to the sand system prior to molding, such as, for example, using ten gallons of the mix with two gallons of thickener, and run though about twenty cycles. The resulting mixture, in this example, is a hydrated and activated green sand, which may not need to be further mulled. In some situations, additional sand may need to be added to make up for any loss during the use and/or collection process. Overall, utilizing this example implementation, less raw materials are required yielding greater cost savings.

In one implementation, the wet sand drawn from the hydrocyclone may be introduced to a separator that is configured to further separate remnant water from the wet sand. That is, for example, the hydrocyclone separates most of the water from the sand, as the water is included with the clay, carbon and water mix (e.g., thereby increasing the amount of water mixed with the clay and carbon in the reclaimed sand/dust). As an example, the separator can comprise any system suitable for performing the function of separating water from the wet sand, such as those that are commercially available. Further, as an example, depending on an amount of moisture content desired for a resulting beneficial re-use sand, a dryer may be utilized to bring the moisture content to a desired level.

In one implementation, as illustrated in FIG. 1, the water separated from the wet sand may be introduced into the sand product and water mixing step or system. As an example, at least a portion of the water used in the mixing step may comprise water collected from the separating step or separator. Further, as an example, beneficial re-use sand can be collected from the separator. For example, beneficial re-use sand typically finds other uses that may not be related to foundry operations. In this example, the beneficial re-use sand can be collected and transported (e.g., or stored) off-site. In one implementation, the re-use sand produced by the methods and systems described herein may have a desired make-up, depending on the target use of the produced sand. For example, certain uses may benefit from a re-use sand with a lower clay content. In this example, the pressure of the sand product and water mix introduced into the hydrocyclone may be approximately fifty to fifty-five psi. In this way, for example, the increased pressure in the hydrocyclone may provide for removal of more clay from the sand mix, resulting in a beneficial re-use sand with a lower clay constituent. In one example, if enough clay is removed from the sand, the resulting re-use sand may be introduced back into the foundry, in the green sand production process.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for producing beneficial re-use sand from foundry sand, comprising the steps of:
    mixing water with a sand product, resulting in a sand product/water mix, the sand product received from a foundry bag-house collector or from spent foundry sand;
    introducing the sand product/water mix to a hydrocyclone at a pressure of about 30 psi to about 35 psi;
    extracting a clay-carbon and water mix from the sand product/water mix, the clay-carbon and water mix re-used in a foundry the clay-carbon and water mix comprising about 70% clay;
    adding about ten gallons of the clay-carbon and water mix from the hydrocyclone to green sand in a muller;
    adding about two gallons of thickener to the about ten gallons of the clay-carbon water mix;
    producing a hydrated and activated green sand;
    extracting wet sand from the sand product/water mix;
    separating the wet sand into a water stream and a sand stream, at least a portion of the water stream is reused in the water and sand product mixing, and the sand stream comprising beneficial re-use sand.

2. The method of claim 1, further comprising the step of introducing the sand product/water mix to a hydrocyclone at about 30 psi.

3. The method of claim 1, further comprising the step of introducing the sand product/water mix to a hydrocyclone at about 35 psi.

4. The method of claim 1, comprising mixing water with a sand product at an approximate ratio of about three-parts water to one part sand product or a smaller ratio of water to sand product.

5. The method of claim 1, wherein extracting of the clay-carbon and water mix from the sand product/water mix and extracting wet sand from the sand product/water mix occurs through a single pass through the hydrocyclone.

6. The method of claim 1, wherein the extracted clay-carbon water mix contains about ten to about eighteen percent solids, with the remaining portion comprising water.

7. The method of claim 1, further comprising the steps of adding additional sand and/or resins to the hydrated and activated green sand.

8. The method of claim 1, further comprising using the beneficial re-use sand for non-foundry use.

9. The method of claim 1, further comprising the step of at least partially removing moisture from the beneficial reuse sand.

10. The method of claim 5, further comprising mixing the water with the sand product to a mixer and introducing the sand product/water mix to the hydrocyclone at about 35 psi.

11. The method of claim 6, wherein the about ten to about eighteen percent solids further comprises about seventy percent clay and about thirty percent carbon.

12. A method for producing beneficial re-use sand from foundry sand, comprising the steps of:
    combining sand product in a mixer;
    mixing water with a sand product, resulting in a sand product/water mix, the sand product received from a foundry bag-house collector or from spent foundry sand;
    introducing the sand product/water mix to a hydrocyclone;
    passing the sand product/water mix through the hydrocyclone at a pressure between about 30 psi and about 35 psi;
    extracting a clay-carbon and water mix from the sand product/water mix hydrocyclone, the clay-carbon and water stream re-used in a foundry, wherein the hydrocyclone extracting the sand product/water mix into a clay-carbon and water stream and a wet re-use sand stream with about 70% clay;
    adding about ten gallons of the clay-carbon and water mix from the hydrocyclone to green sand in a muller;
    adding about two gallons of thickener to the about ten gallons of the clay-carbon water mix;
    producing a hydrated and activated green sand;
    extracting wet sand from the sand product/water mix hydrocyclone;
    separating the wet sand into a water stream and a sand stream at least a portion of the water stream is reused in the water and sand product mixing, and the sand stream comprising beneficial re-use sand.

13. The method of claim 12, further comprising the step of passing the sand product/water mix through the hydrocyclone a single time.

* * * * *